Figure 4:
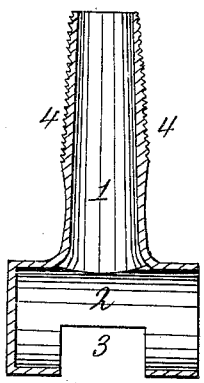
Figure 1:
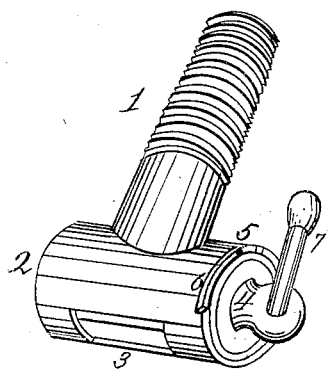
Figure 3:
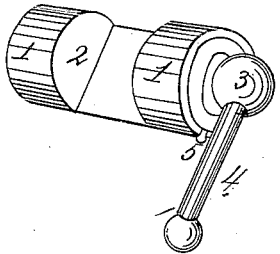
Figure 2:
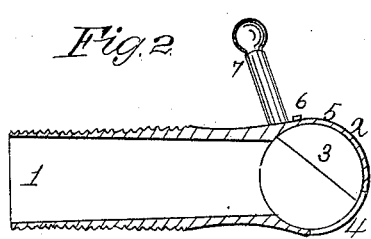

J. D. Kellogg & J. Wright, Jr.,
Molasses Gate.
N° 1,290.  Patented Aug. 16, 1839

UNITED STATES PATENT OFFICE.

JONA. D. KELLOGG AND JUSTUS WRIGHT, JR., OF NORTHAMPTON, MASSACHUSETTS, ASSIGNORS TO JONA. D. KELLOGG.

MOLASSES-GATE.

Specification of Letters Patent No. 1,290, dated August 16, 1839.

*To all whom it may concern:*

Be it known that we, JONATHAN D. KELLOGG and JUSTUS WRIGHT, Jr., both of Northampton, in the county of Hampshire and State of Massachusetts, have invented a new and useful Improvement in Machines for Drawing Molasses and All other Fluids from Casks, &c.; and we do hereby declare that the following is a full, clear, and exact description of the construction and operation of the same; reference being had to the annexed drawings, making a part of this specification, in which—

Figure I is a perspective view, Fig. II a longitudinal section; Fig. III, a view of the faucet and lever; Fig. IV, a sectional view of the hollow cylinder or cone.

Fig. I, perspective view. No. 1, a part of the tap composed of a hollow metallic cylinder with a screw thread cut on the outside about two-fifths of its length from the open end; 2, another part of the tap of the same material in the form of a hollow truncated cone connected with the part 1, at a right angle near the center thereof like that of a common tap and faucet, and having an aperture 3 in the form of a parallelogram near the underside, when inserted into the cask; 4, the end and button of the faucet, being a solid metallic truncated cone with a portion of its diameter cut off as is hereinafter described and countersunk at the end 2 and revolving within the hollow truncated cone about one fourth of a circle, guided and limited by the groove 6 and pin 5; 7, a small wooden lever, or handle, passing through the center of the button 4, for the purpose of turning the cone, and opening and closing the aperture.

Fig. II, a longitudinal section. Nos. 1 and 2, a longitudinal and sectional concave view of the truncated cone and hollow metallic cylinder forming the tap part; 3, the faucet in the discharging position; 4, the orifice or aperture; 5, the groove in the end of the hollow truncated cone which guides and limits the faucet and lever 7; 6, the pin which works in the groove 5; 7, the wooden lever in the head of the button 4, Fig. I.

Fig. III, view of the solid truncated cone or faucet. Nos. 1, 1, a solid metallic truncated cone, with a portion of its diameter cut off at 2 near its center and opposite to the aperture 3, Fig. I; 3, the button on the head of the cone; 4, the handle or lever by which the cone is turned in the tap, and opening and closing the aperture; 5, the pin moving in the groove 6, Figs. I and II, limiting and guiding the cone, or faucet, on opening and closing the aperture.

Fig. IV, a longitudinal section of the hollow cylindrical cone. No. 1, internal view of the tap part; 2, ditto of the part at right angles with No. 1; 3, the aperture in the same; 4, 4, the screw cut on the outside of the tap.

Manner of construction, &c.: The composition of metal used by us for the construction of our said machine and improvement consists of about 90 parts or zinc in 100, to 10 parts of tin, but the same may be constructed of other metals or composition of metals which will wear a smooth or even surface. In preparing the composition we melt the component parts together, stirring them thoroughly during the fusion that the mixture may be complete and pour it into cast iron molds one for the tap and another for the faucet. The internal surfaces 1, 2, Fig. IV, are rimmed out with a tapering rimmer and the screw 4, 4, cut on the same. The solid cylinder, Fig. III, is turned in a lathe to fit its socket 2, Fig. IV, a female screw is then cut in the button 3, Fig. III, and a lever with a male screw inserted therein 4, Fig. III; a pin is then inserted in the solid cylinder 5, Fig. I, to limit the motion of that cylinder in its socket. The end of the solid cylinder opposite the lever is countersunk to fasten it in its socket and by which means it is easily riveted if it should work loose in its socket.

Our said machine and improvement is called by us "Kellogg's improved liquor gate" and

What we claim as our invention and desire to secure by Letters Patent is—

The rotary valve, Fig. III, No. 2, in combination with the hollow cylinder, or truncated cone, Fig. I, No. 2, constructed and operating in the manner herein described.

Mode of operation: Insert the tap into the cask from which the liquor is to be drawn with the outer orifice underneath when by moving the lever, or handle backward and forward the orifice is opened or closed at pleasure.

JONATHAN D. KELLOGG.
JUSTUS WRIGHT, Jr.

Witnesses:
WM. HUTCHINS,
SAMUEL WELLS.